UNITED STATES PATENT OFFICE.

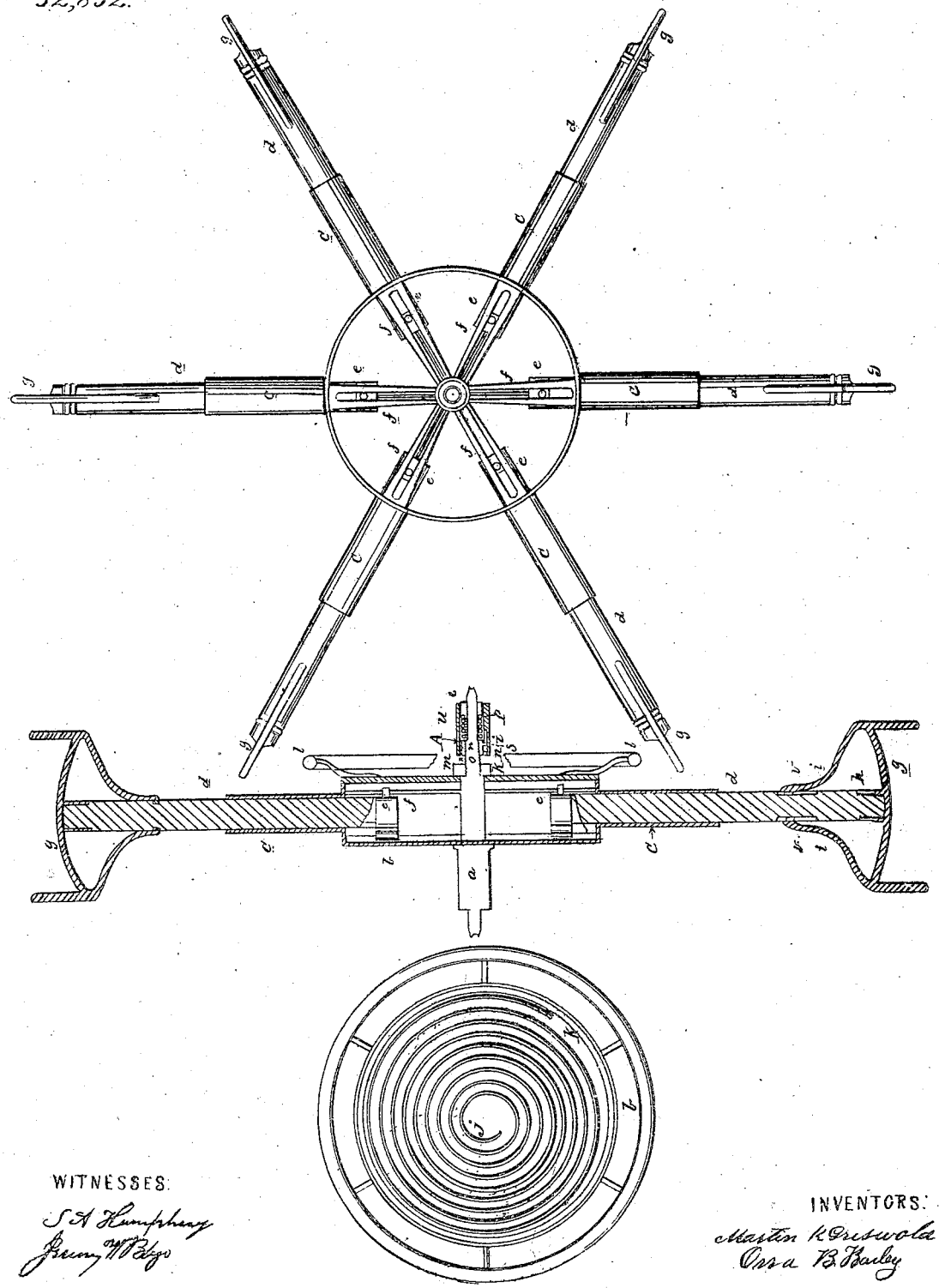

M. R. GRISWOLD AND O. B. BAILEY, OF WATERTOWN, CONNECTICUT.

SWIFT.

Specification of Letters Patent No. 32,832, dated July 16, 1861.

*To all whom it may concern:*

Be it known that we, M. R. GRISWOLD and O. B. BAILEY, of Watertown, county of Litchfield, and State of Connecticut, have invented certain new and useful Improvements in Swifts; and we do hereby declare that the same is described and represented in the following specification and drawings; and to enable others skilled in the art to make and use our said improvement we will proceed to describe its construction and operation, referring to the drawings, in which the same letters indicate like parts in each of the figures.

The nature of this improvement, will be fully ascertained and understood from the specification and the accompanying drawings, in which—$a$. is a shaft, or axis, on which the swift revolves. $b$. is a cylinder or case, secured to the said shaft. Upon the edge, or circumference thereof, are made, tubes $c$.—arranged in nearly equal diverging lines, from the center of the shaft $a$,—the object of which is to receive the arms $d$. (of the swift). These arms are designed to move endwise, in and out, of the case $b$. through the tubes $c$. and are held from turning, by means of proper holding device, such as the pins $e$. and slotted plates $f$. or their substantial equivalents. The outer ends are provided with bridges or arms $g$. We propose sometimes to contract or expand the length of the arms by securing the arms or bridge $g$. to a screw thimble or washer $h$. and forming slits $v$ in the sides of the arms $d$. to receive the spring braces $i$. for the purpose of holding the bridge $g$. in its proper position when screwed on, or off of the arms $d$. to any desired point. But we believe the employment of a worm or screw $j$. arranged upon the inner surface of the cap $k$. of the case $b$. so as to receive the ends of the pins $e$. secured in the ends of the arms $d$. is a better way. The said plate or cap $k$. is provided with a crank handle or rim wheel $l$. by the use of which the cap $k$. (having the worm or screw $j$.) may be turned in either direction, and by so doing the arms $d$. may be extended or contracted, by the action of the said screw or worm $j$. The cap $k$ is held up to its place, to the case $b$. by means of the nut $m$. Now it will be clearly seen that by the use of the worm or screws $j$. acting upon the arms $d$. by means of any proper connection, they will be simultaneously extended outward, or contracted inward as desired, whereby the length of the threads in a skein taken from the swift (and cut for sewing, or for other purposes) will be of different lengths, more or less, as desired.

The adjustable collar arrangement A. upon one end of the shaft $a$, composed of nut $n$, spring $u$, collar $t$ and tube $p$, is designed for producing tension or friction to the shaft, or swift when desired, and to prevent the endwise play of the shaft. The outer end of said collar is designed to take its bearing against the box in which the end of the shaft $a$. is secured, so that by turning the collar A. it may be moved toward or from the end of the shaft, and thereby the said shaft or swift will become more free, or less free to turn on its centers or bearings.

$n$. is the nut which when turned contracts or extends the collar A toward or from the box or bearings of the shaft.

$u$ is a spring to cause an outward pressure from the nut $n$.

$t$. is a collar fitted onto the shaft $a$, and is secured into the outer end of the tube $p$. and they are designed to take their bearing against the box in which the shaft turns. The tube $p$. is provided with a groove for the protuberance $s$, formed on the nut $n$, to allow the tube $p$. to play back and forth thereon, and so that the nut $n$ may be turned by turning the tube $p$.

We believe we have shown the nature, mode of construction, and the advantage to be derived therefrom, to enable a person skilled to make and use the same.

What we claim therefore and desire to secure by Letters Patent is—

1. The employment of a worm or screw $j$, or its mechanical equivalent, in combination with the pins $e$ and slotted plates $f$, to contract or extend the arms $d$ substantially as and for the purpose described.

2. The combination of the tubular screws $h$ spring braces $i$ and slots $v$ arranged and operating substantially as and for the purpose described.

3. The combination of the nut $n$ spring $u$ collar $t$, tube $p$ arranged and operating substantially as and for the purpose described.

MARTIN R. GRISWOLD.
ORRA B. BAILEY.

Witnesses:
S. A. HUMPHREY,
JEREMY W. BLISS.